No. 731,713. PATENTED JUNE 23, 1903.
M. SCHOU.
CONVEYER.
APPLICATION FILED MAY 10, 1901.
NO MODEL. 2 SHEETS—SHEET 1.
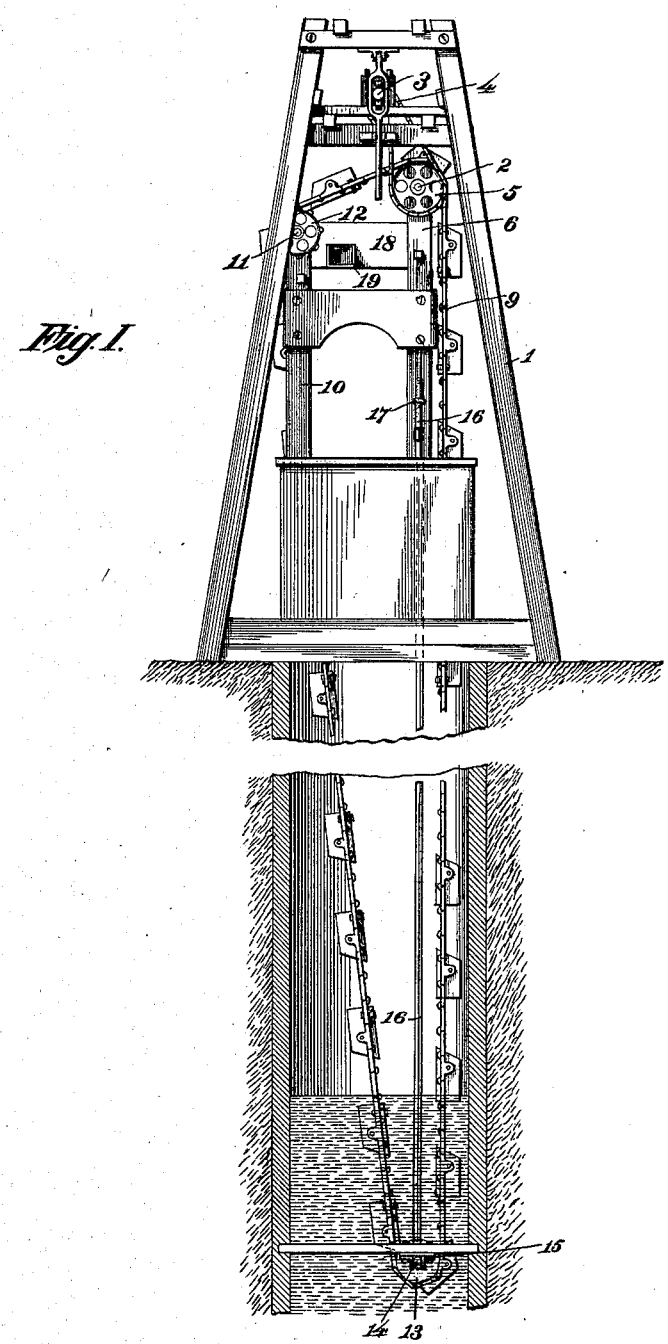
Fig. I.
Witnesses
Inventor:
Attorney

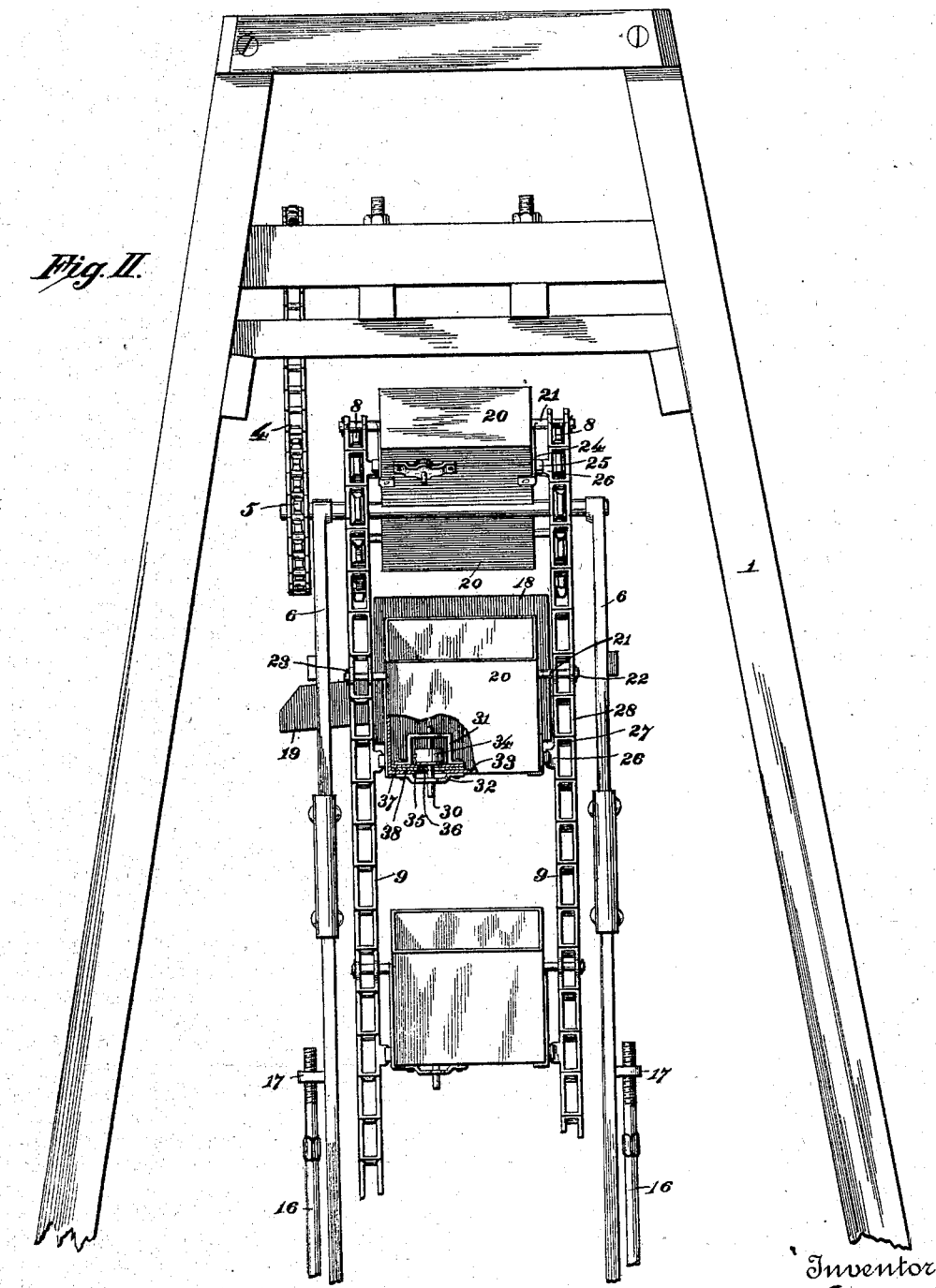

No. 731,713. Patented June 23, 1903.

UNITED STATES PATENT OFFICE.

MATHIAS SCHOU, OF WYMORE, NEBRASKA.

CONVEYER.

SPECIFICATION forming part of Letters Patent No. 731,713, dated June 23, 1903.

Application filed May 10, 1901. Serial No. 59,652. (No model.)

*To all whom it may concern:*

Be it known that I, MATHIAS SCHOU, of Wymore, in the county of Gage, State of Nebraska, have invented certain new and useful Improvements in Conveyers, of which the following is a complete specification, reference being had to the accompanying drawings.

The object of my invention is to produce improvements in conveyers of the type in which a series of buckets is carried upon endless chains, and particularly in such devices for raising water from a lower to a higher level.

In the accompanying drawings, Figure I is a side elevation of my apparatus complete, the well with which it connects being illustrated in section. Fig. II is an elevation of a portion of Fig. I, taken at right angles thereto, portions being broken away for illustration of details.

Referring to the numerals on the drawings, 1 indicates a supporting-frame, which may be of any suitable shape and dimensions. It is designed to support in operative relation to a shaft 2 a driving-shaft 3, and the latter is for that purpose connected, as by a sprocket-chain 4, with a sprocket-wheel 5, fixed to the shaft 2. The shaft is carried in bearings in a pair of uprights 6 and is also provided with a pair of sprocket-wheels 8, with which engage the links of endless sprocket-chains 9. The form of sprocket-chain illustrated is that in which the links are laterally separable—that is to say, in which the links can be united or disunited by fixing them in certain relative positions and slipping them together or apart by relatively sidewise movement.

The shaft 3 is merely illustrative of one mode of applying driving power to the shaft 2 and appears to require nothing more than identification and substantially diagrammatic illustration.

Parallel to the uprights 6 is a pair of uprights 10, in which a little below the level in which the shaft 2 is carried is journaled a shaft 11, having sprocket-wheels 12, which support the chains 9 on an incline between the shafts 2 and 11. The chains 9 make a lowermost bend about sprocket-wheels 13, fixed to a shaft 14, that is carried in bearings 15 within the well or other place in which the conveyer is intended to operate. The bearings 15 are operatively connected with rods 16, which screwing into eyelets 17, secured, respectively, to the uprights 6, for example, afford means for regulating the tension upon the chains 9.

Carried between the uprights 6 and 10 is a trough 18, provided with a discharge-spout 19. The top of the trough 18 being open, the buckets carried upon the chains 9 begin to discharge thereinto as soon as they pass over the shaft 2 and completely empty in passing from the shaft 2 to the shaft 11, constant discharge of their contents being made through the spout 19. The buckets carried upon the chains 9 are indicated by the reference-numeral 20. They are preferably of oblong rectangular shape and made of metal. Each is provided upon opposite sides with trunnions 21, located near the upper end thereof. Each trunnion works in bearings 22, provided for it in a special link of the chain 9, the trunnion extending just through its bearing and being preferably provided with a cotter-key 23 for holding it in place in its bearings 22. For guiding the buckets around the sprockets upon which the chains 9 move I provide near the bottom of each bucket, upon opposite sides thereof, plates 24, provided with a pair of jaws 25, between each of which works an ear 26, projecting laterally from a special link 27 of the chains 9. The link 27 is preferably separated from that which carries the bearings 22 by a single intermediate link 28, and the trunnions 21 and plates 24 of each bucket are disposed accordingly.

Each of the trunnions 21 is located, as indicated in Fig. I, approximately in the upper middle part of each bucket, and each of the plates 24 is located sufficiently near to one side of the medial line extended downwardly from said trunnions to accommodate the special links of the chains 9, which are provided with the bearings 22. By this arrangement the weight of the buckets 20, both loaded and unloaded, is distributed so as to hang true from the trunnions, and the buckets are adapted to carry their loads without the aid of tracks and without deflection of the chains from the direct lines of travel.

By reference to Fig. I it will be perceived that the chains carry the buckets upwardly and in a substantially vertical line, but plunge them in their descent directly into the water. Consequently provision must be made for egress of air from each bucket while it is taking its load of water. For this purpose I prefer to provide in each bucket a valve-stem 30, working in bearing-plates 31 and 32, secured to the inside and outside, respectively, of the bottom 33. To the stem 30 between the bottom and the plate 31 is secured a weight 34, to the face of which is applied a valve-piece 35, which may be made, for example, of leather. This valve-piece is adapted to open and close an air-vent 36 in the bottom 33 of the bucket. I prefer to seat the valve against a reinforcing-plate 37, fixed to the bottom 33, and preferably against an intermediate pad 38, which may be made also of leather.

In operation, the shaft 2 being rotated in the required direction, the buckets 20 are successively forced through the water and around the shaft 14 and drawn up to the shaft 2. In passing downwardly the gravity-valves in the respective buckets are opened by the dropping of their weight 34. Consequently as the buckets successively pass into the water the air is forced out through their vents 36, when after each bucket passes around the pulleys 13 the weight 34 drops to close the valve and the bucket is enabled to retain its load of water. In Fig. I of the drawings one of the buckets is shown as in the act of passing over the pulleys upon the shaft 2. As soon as that bucket passes the horizontal line it begins to discharge into the trough 18, and by the time it reaches the pulleys 12 on the shaft 11 it has delivered its load. Through the relative locations of the shafts 2 and 11 the discharge of each bucket is accomplished successfully and without violent dash of the water into the trough 18.

By reason of the construction of the trunnions and jaws 25 of the buckets 20, in conjunction with the special links of the chain 9, my device is not only adapted to operate successfully and economically, but any one of the buckets can be readily disconnected from the chain without removing the chains and without disturbing the remaining buckets. When the chains are made of laterally-separable links, the facility of detaching and reattaching buckets is increased. This is a particularly important feature in practice, inasmuch as it enables an operator to keep his buckets in repair without interrupting the operation of the device as a whole.

What I claim is—

1. In a conveyer the combination with a series of buckets, shafts and pulleys and endless chains thereon constituting exclusive means of supporting the buckets, of disalined trunnions and jaws upon opposite sides of each bucket, and corresponding relatively spaced special links in the chains, provided, respectively, with bearings for the trunnions and ears for the jaws upon the buckets.

2. In a conveyer the combination with a series of buckets, shafts and pulleys and endless chains thereon constituting exclusive means of supporting the buckets, of disalined trunnions and jaws upon opposite sides of each bucket, and corresponding relatively spaced special links in the chains, provided, respectively, with bearings for the trunnions and ears for the jaws upon the buckets, the said trunnions being located respectively near the upper middle part of the sides of the buckets, for distributing the weight thereof upon their chains.

In testimony of all which I have hereunto subscribed my name.

MATHIAS SCHOU.

Witnesses:
   JOHN B. A. BELAND,
   JOHN VEGALINY.